UNITED STATES PATENT OFFICE.

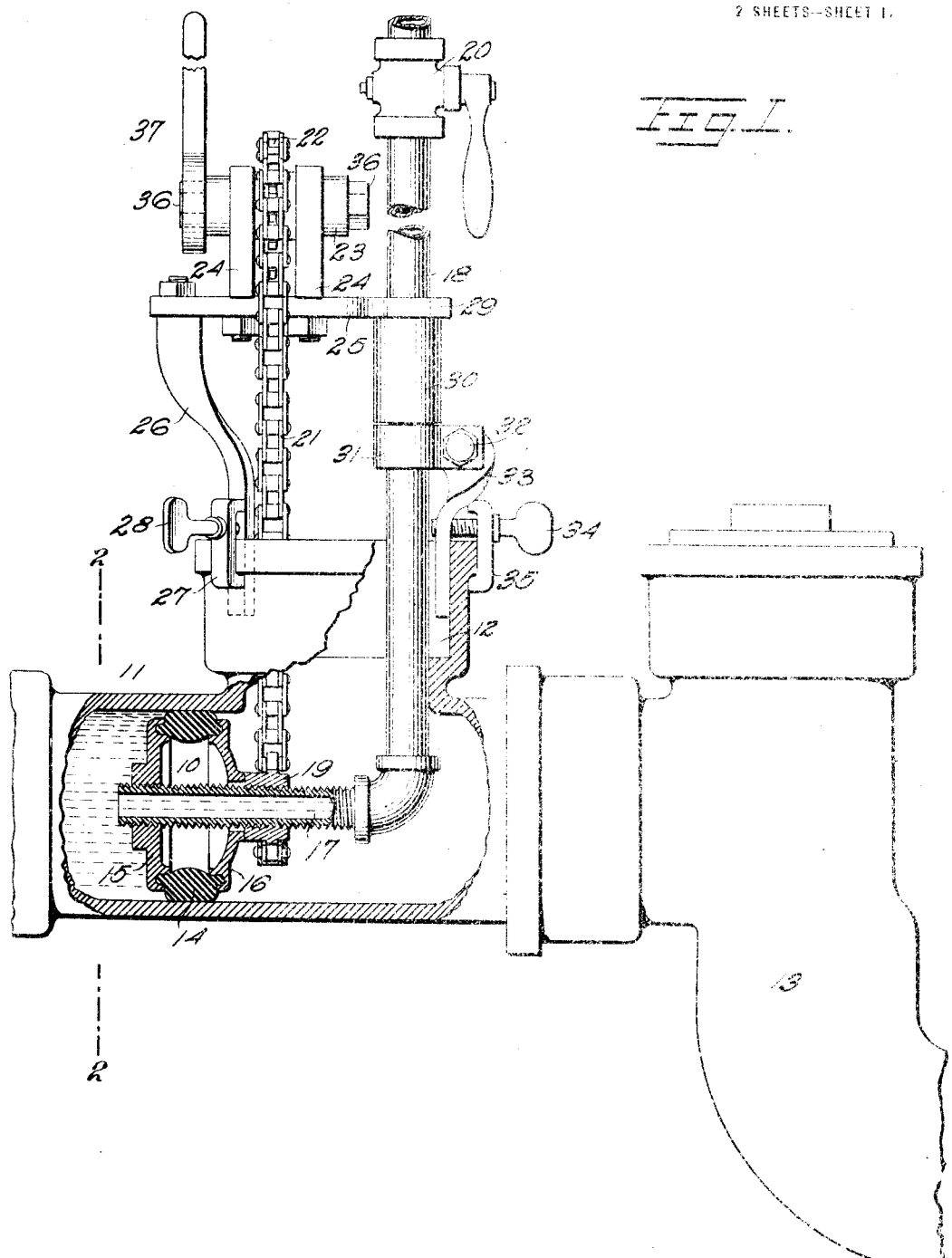

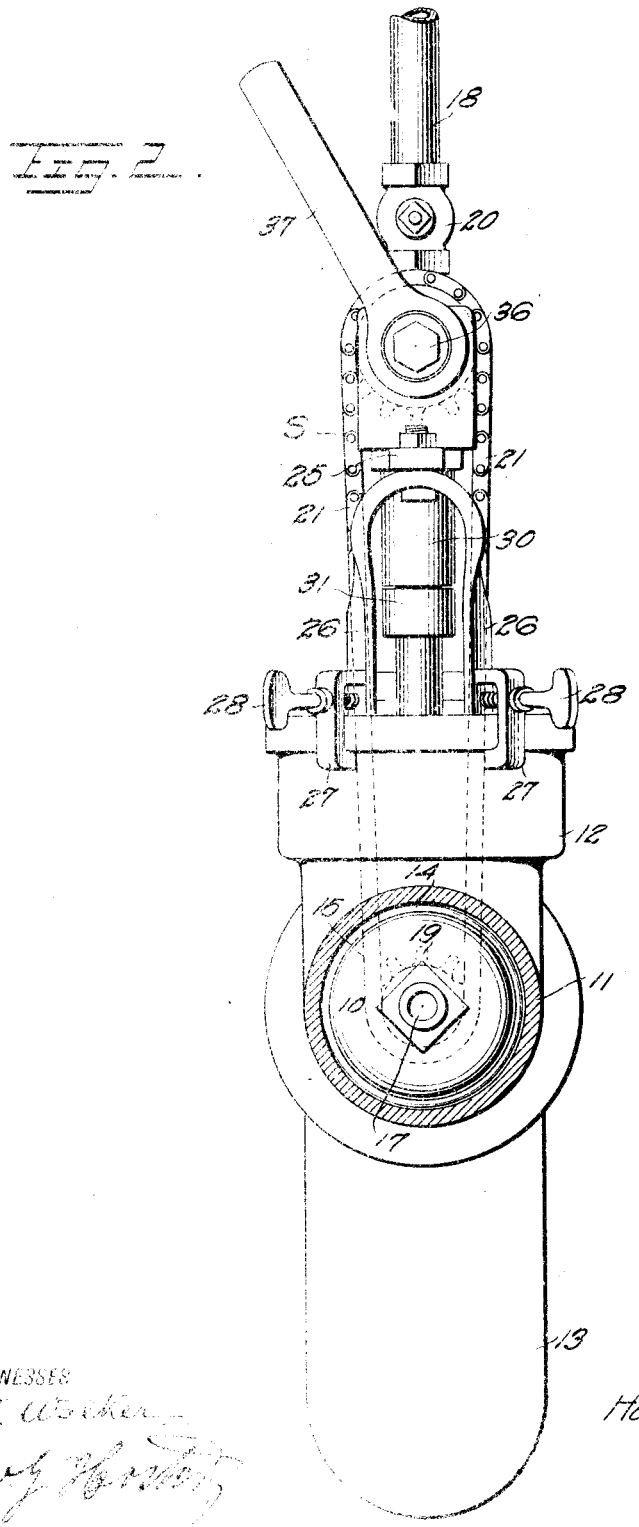

HARRY KAYFETZ, OF NEW YORK, N. Y.

OPERATING DEVICE FOR EXPANDING-PLUGS.

1,177,338.  Specification of Letters Patent.  Patented Mar. 28, 1916.

Application filed September 14, 1915.   Serial No. 50,617.

*To all whom it may concern:*

Be it known that I, HARRY KAYFETZ, a citizen of the United States, and a resident of the city of New York, borough of Brooklyn, in the county of Kings and State of New York, have invented a new and Improved Operating Device for Expanding-Plugs, of which the following is a full, clear, and exact description.

The invention relates to expanding plugs formed of a rubber cylinder interposed between two washers adapted to be pressed toward each other to expand the cylinder against the inner surface of a pipe on which the plug is to be used.

The object of the invention is to provide a new and improved operating device more especially designed for expanding a plug in the pipe leading to a sewer to permit of making a house test of the plumbing, and arranged to permit the plumber to conveniently place the operating device in position together with the plug and to actuate the operating device with a view to expand the plug by means controlled exteriorly of the pipe.

In order to accomplish the desired result use is made of a frame adapted to be removably attached to the hub of the pipe in which the plug is to be expanded, and a manually controlled operating device mounted on the said frame and extending through the said hub into the pipe to engage the actuating member of the plug.

A practical embodiment of the invention is represented in the accompanying drawings forming a part of this specification in which similar characters of reference indicate corresponding parts in both views.

Figure 1 is a side elevation of the operating device as applied, parts being shown in section; and Fig. 2 is a cross section of the same on the line 2—2 of Fig. 1.

The expanding plug 10 of any approved construction is shown applied within a pipe 11 having a hub 12 and connected with the pipe 13 leading to a sewer. The expanding plug 10 consists of a ring or cylinder 14 interposed between the washers 15 and 16, of which the washer 15 screws on the threaded end 17 of the supply pipe 18 while the washer 16 is loose on the pipe 17 and is forced against the ring 14 by a sprocket wheel nut 19 screwing on the threaded portion 17 of the supply pipe 18. The supply pipe 18 is provided with the usual valve 20 and is adapted to be connected with a source of water supply to allow of testing the plumbing by forcing water into the pipe 11 and into the various pipes connected with the same. The sprocket wheel nut 19 is engaged by the lower end of a sprocket chain 21 also passing around a sprocket wheel 22 secured on the shaft 23 journaled in suitable bearings 24 attached to the top 25 of a frame having a double arm 26 depending from the top 25 and engaging the interior of the hub 12. Clamping pieces 27 engage the exterior of the hub 12 and the side members of the arm 26, and screws 28 pass through the said clamping members 27 and screw in the side members of the arm 26 to securely clamp the frame in place. The top 25 is preferably in the form of a fork 29 straddling the supply pipe 18 and resting on top of a sleeve 30 which in turn rests on a collar 31 clamped to the supply pipe 18 by a screw 32 on which is held a depending arm 33 in which screws a screw 34 engaging a clamping member 35 fitting exteriorly on the hub 12 so as to form a very rigid support in conjunction with the frame previously mentioned for supporting the operating device exteriorly on the hub 12 of the pipe 11. The shaft 23 is provided with polygonal terminals 36, either of which is adapted to be engaged by a ratchet wrench 37 of usual construction for turning the shaft 23 with a view to rotate the sprocket wheel 22 in either a forward or reverse direction.

The operation is as follows: The pipe 18 with the unexpanded plug 10 thereon can be readily lowered into the pipe 11 by way of the hub 12, and then the framework including the collar 31 and arm 33 are fastened in position on the hub 12, after which the operator applies the ratchet wrench 37 to one of the polygonal ends 36 of the shaft 23 to rotate the said shaft in one direction. When this takes place a traveling motion is given to the sprocket chain 21 whereby the latter rotates the wheel nut 19 and screws the same forward on the threaded end 17 of the pipe 18. This forward movement of the wheel nut 19 causes a like movement of the movable washer 16 so that the ring or cylinder 14 is pressed and expanded against the inner surface of the pipe to close the same. Water is now passed through the pipe 18 under pressure to test the plumbing system in the house in the usual manner. After the test has been made, the operator reverses the ratchet wrench 37 of the shaft 23 to rotate the latter in the reverse direction with a view to turn the wheel nut 19 in a reverse direction to release the rubber ring or cylinder 14. The framework is then detached from the hub 12 to permit of conveniently removing the operating device and the plug 10 from the pipe 11 by way of the hub 12. In order to prevent splashing of the outflowing water into the operator's face when releasing the rubber ring or cylinder 14, use is made of a bag or piece of canvas or the like, placed over the operating device while the operator turns the shaft 23 in a reverse direction.

The operating device shown and described is very simple and durable in construction and enables a plumber or other person to readily apply the same to the pipe 11 and to operate the same at a point remote from the pipe. It will also be noticed that by the use of the operating device the hub 12 or the pipe 11 is not liable to be injured, which is common by the means now employed for actuating the expanding plug 10.

Having thus described my invention, I claim as new and desire to secure by Letters Patent:

1. In combination, an expanding plug adapted to be expanded within a pipe adjacent to a hub on the pipe, a frame having depending members, means for removably securing the said members to the hub to hold the frame in place, bearings mounted on the top of said frame, and a manually controlled operating device mounted to turn on the said bearings and extending through the said hub into the pipe to engage the actuating member of the said plug.

2. An operating device for expanding plugs, comprising a frame adapted to be removably attached to the hub of a pipe in which the plug is to be expanded, the said frame having a member forming a guide for the supply pipe of the expanding plug, a sprocket wheel journaled in bearings on the said member of the frame remote from the said hub, manually controlled means for turning the said sprocket wheel, a sprocket chain engaging the said sprocket wheel, and a second sprocket wheel engaged by the said sprocket chain having an interior screw thread engaging a threaded portion on the said supply pipe, the said sprocket wheel forming the actuating member of the expanding plug.

3. An operating device for expanding plugs, comprising a frame adapted to be removably secured to the hub of the pipe in which the plug is to be expanded, a shaft journaled on the said frame and having a polygonal end, a ratchet handle adapted to be engaged with the said polygonal end to turn the shaft in a forward or reverse direction, a sprocket wheel secured on the said shaft, a sprocket chain passing around the said sprocket wheel, and a second sprocket wheel around which passes the said chain and which is provided with an interior screw thread, the said second sprocket wheel forming the actuating member of the expanding plug and being mounted to screw on the threaded portion of the supply pipe of the expanding plug.

4. An operating device for expanding plugs, comprising a frame having a depending portion adapted to be removably attached to the hub of the pipe in which the plug is to be expanded, the said frame having a top member adapted to straddle the supply pipe of the expanding plug, and a manually controlled operating device mounted on the top member of said frame and extending through the said hub into the pipe to engage the actuating member of said plug.

5. In combination, an expanding plug having a supply pipe provided with a threaded portion, a wheel nut screwing on the threaded portion and forming the actuating member of the expanding plug, a frame having a depending portion adapted to be removably secured to the hub of the pipe in which the plug is to be expanded, the supply pipe of the expanding plug bearing against the inside of the hub, the said frame having a horizontal top member removably engaging the said supply pipe, and manually controlled means supported on the top member of the frame and extending through the said hub into the pipe for actuating the said wheel nut.

6. An operating device for expanding plugs, comprising a frame having a top member, and a double arm depending from one end of the top member, means for clamping the members of the said arm to the hub of a pipe, in which the plug is to be expanded, to removably hold the frame in place, the other end of said top member of the frame being adapted to detachably engage the supply pipe on which the expanding plug is secured, bearings on the top member of said frame, a manually controlled shaft journaled in said bearings, and means for controlling the actuating member of said expanding plug from the said shaft.

In testimony whereof I have signed my name to this specification in the presence of two subscribing witnesses.

HARRY KAYFETZ.

Witnesses:
LILLIAN ROSENTHAL,
JOSEPH ROSENTHAL.